United States Patent
Jammu et al.

(10) Patent No.: US 8,046,191 B2
(45) Date of Patent: Oct. 25, 2011

(54) METHOD FOR MONITORING PERFORMANCE OF A HEAT TRANSFER DEVICE

(75) Inventors: Vinay Bhaskar Jammu, Karnataka (IN); Nishith Pramod Vora, Bensalem, PA (US); Ravi Yoganatha Babu, Karnataka (IN); Rama Venkata Mahajanam, Radnor, PA (US)

(73) Assignee: General Electric Company, Niskayuna, NY (US)

( * ) Notice: Subject to any disclaimer, the term of this patent is extended or adjusted under 35 U.S.C. 154(b) by 726 days.

(21) Appl. No.: 11/864,191

(22) Filed: Sep. 28, 2007

(65) Prior Publication Data

US 2008/0015816 A1    Jan. 17, 2008

Related U.S. Application Data

(63) Continuation-in-part of application No. 10/955,117, filed on Sep. 30, 2004, now Pat. No. 7,286,960.

(51) Int. Cl.
*G06F 17/40* (2006.01)
*G06F 17/00* (2006.01)

(52) U.S. Cl. ......... 702/182; 702/185; 702/183; 700/300

(58) Field of Classification Search .................... 702/85, 702/132, 182–185; 700/274–278, 299–300; 714/47–48; 165/276–277; 237/19
See application file for complete search history.

(56) References Cited

U.S. PATENT DOCUMENTS

| | | |
|---|---|---|
| 4,669,310 A | 6/1987 | Lester |
| 5,083,438 A | 1/1992 | McMullin |
| 5,280,756 A | 1/1994 | Labbe |
| 5,311,421 A | 5/1994 | Nomura et al. |
| 5,333,240 A | 7/1994 | Matsumoto et al. |
| 5,363,693 A | 11/1994 | Nevruz |
| 5,367,470 A | 11/1994 | Lang |
| 5,480,298 A | 1/1996 | Brown |
| 5,590,706 A | 1/1997 | Tsou et al. |
| 5,790,420 A | 8/1998 | Lang |
| 5,845,272 A | 12/1998 | Morjaria et al. |

(Continued)

FOREIGN PATENT DOCUMENTS

EP         0155826 A2     9/1985

(Continued)

OTHER PUBLICATIONS

Byington et al., "Prognostic Enhancements to Diagnostic Systems for Improved Condition-Based Maintenance", IEEE, pp. 6-2815-6-2824m 2002.

(Continued)

*Primary Examiner* — Hal Wachsman
(74) *Attorney, Agent, or Firm* — Fletcher Yoder

(57) ABSTRACT

A method is provided for the monitoring of heat transfer devices. The method includes the acts of receiving data from a heat transfer device, and computing a performance indicator indicative of an incipient anomaly condition of the heat transfer device based upon the received data, and/or computing a normalized efficiency of the heat transfer device. The normalized efficiency represents a corrected efficiency that isolates effects of a process parameter on performance of the heat transfer device. The data represents a measurable process parameter or a change in a measurable process parameter in the heat transfer device. The method receives the data and computes a performance indicator to predict performance degradation of the heat transfer device over time based upon the received data.

4 Claims, 5 Drawing Sheets

U.S. PATENT DOCUMENTS

Figure 1:
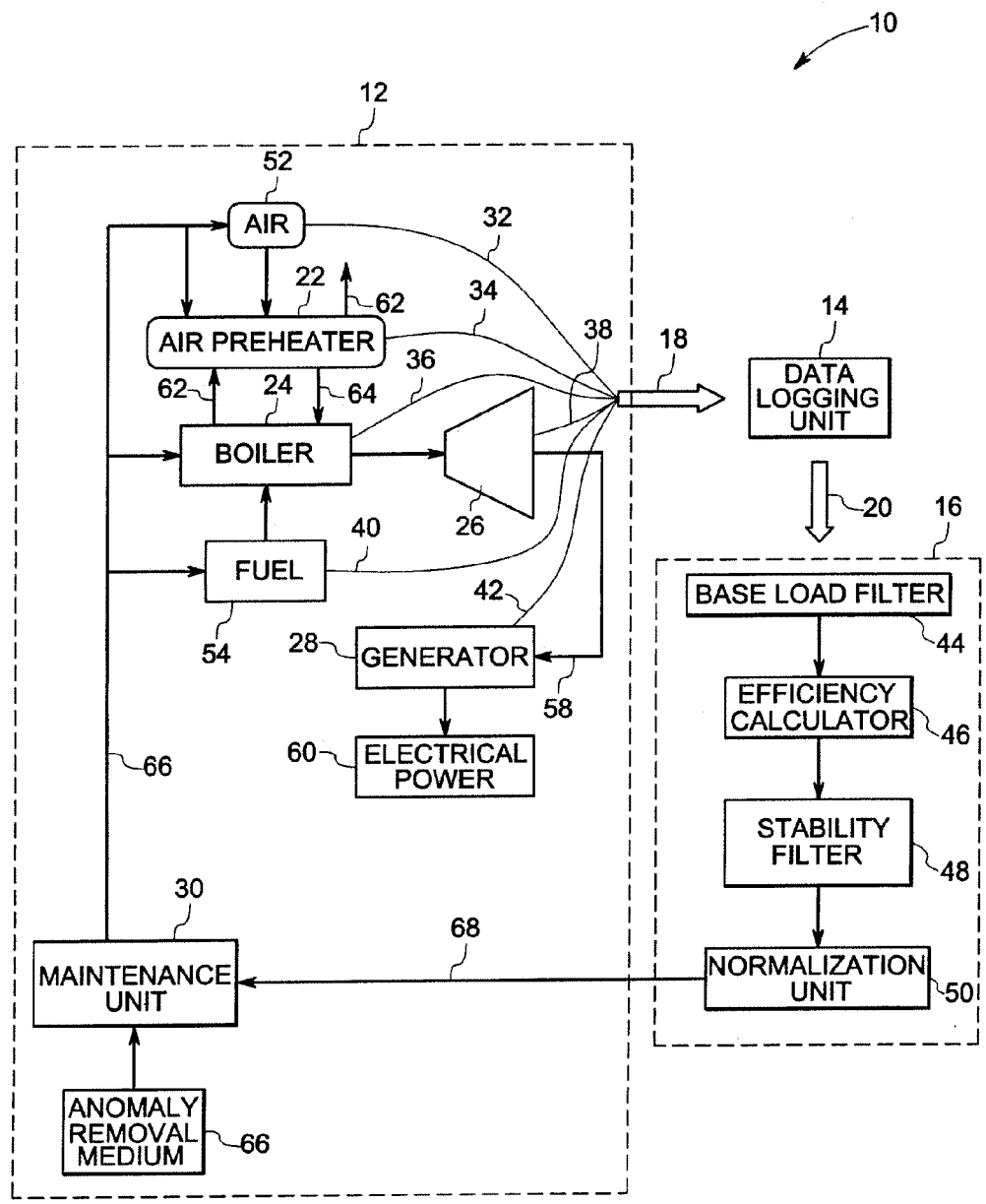

| | | | |
|---|---|---|---|
| 6,023,070 | A | 2/2000 | Wetegrove et al. |
| 6,136,281 | A | 10/2000 | Meischen et al. |
| 6,163,740 | A | 12/2000 | Beltracchi |
| 6,266,597 | B1 | 7/2001 | Russell et al. |
| 6,289,299 | B1 | 9/2001 | Daniel, Jr. et al. |
| 6,485,578 | B1 | 11/2002 | Park et al. |
| 6,507,774 | B1 | 1/2003 | Reifman et al. |
| 6,522,994 | B1 | 2/2003 | Lang |
| 6,651,035 | B1 | 11/2003 | Lang |
| 6,799,146 | B1 | 9/2004 | Lang |
| 7,113,888 | B2 | 9/2006 | Nagano et al. |
| 7,286,960 | B2 * | 10/2007 | Jammu et al. ................. 702/182 |
| 2002/0168302 | A1 | 11/2002 | Pahlman et al. |
| 2002/0197199 | A1 | 12/2002 | Fan et al. |
| 2003/0007900 | A1 | 1/2003 | Shimizu et al. |
| 2003/0019221 | A1 | 1/2003 | Rossi et al. |
| 2003/0065481 | A1 | 4/2003 | Fujishima et al. |
| 2006/0020420 | A1 | 1/2006 | Vesel |
| 2006/0041335 | A9 | 2/2006 | Rossi et al. |

FOREIGN PATENT DOCUMENTS

| | | | |
|---|---|---|---|
| EP | 1443375 | A1 | 8/2004 |

OTHER PUBLICATIONS

Widarsson et al., "Bayesian Network for Decision Support on Soot Blowing Superheaters in a Biomass Fuelled Boiler", 8th International Conference on Probabilistic Methods Applied to Power Systems, Iowa State University, Ames, Iowa, pp. 212-217, Sep. 12-16, 2004.

Valero et al., "Ash Fouling in Coal-Fired Utility Boilers Monitoring and Optimization of On-Load Cleaning", Prog. Energy Combust. Sci., vol. 22, pp. 189-200, 1996.

* cited by examiner

METHOD FOR MONITORING PERFORMANCE OF A HEAT TRANSFER DEVICE

CROSS REFERENCE TO RELATED APPLICATIONS

This application is a Continuation-In-Part of U.S. patent application Ser. No. 10/955,117, filed on 30 Sep, 2004, and issued on 23 Oct, 2007 as U.S. Pat. No. 7,286,960, which is incorporated herein by reference.

BACKGROUND

1. Technical Field

The invention includes embodiments that may relate to a system and/or method for monitoring one or more a heat transfer device. The heat transfer device may be in a power plant.

2. Discussion of Art

Power plants may be classified based on the process for electrical power generation. Power plant classifications include thermal power plants, hydroelectric power plants, nuclear power plants, geothermal power plants, wind farms, and solar farms. Each generating modality operates with a specific differing input to produce an electrical power output. In a power plant, a heat transfer device may include a furnace firewall, air preheater, superheater, reheater, economizer, and the like. The heat transfer device may transfer heat from one medium to another medium to maintain a continuous generation of electrical power.

A heat transfer device function may produce an undesired by-product that can subsequently hinder the functioning of the processes. As a result, the efficiency of the power plant decreases with time and overall cost of operation of the power plant increases. Boilers, for example, form an integral part of power plant that uses combustion to generate steam to run turbines. Common types of fuel used to fire boilers include coal and fuel oil. Due to chemical by-products released during combustion, the boilers may foul or form slag.

Fouling is the accumulation of ash and by-products of incomplete combustion as a layer on an inner surface of a boiler. A layer of fouling substance may have low thermal conductivity that reduces the amount of heat transferred in heat exchanging components. In the case of a boiler, this may cause an increase in temperature inside the boiler for a given amount of steam production, a decrease in functional efficiency of the boiler, and an increase in pressure drop within the boiler due to reduced cross-sectional area. Slagging is a process similar to fouling. Slagging refers to deposition of solid or molten layers on the outside surface of the boiler tubes. A process known as sintering may form such layers. Sintering is the bonding of adjacent surfaces of particles into a hard deposit. Sintering subsequently strengthens the mass, causing an increase in tenacity of the deposit on the surface. Both fouling and slagging may be self-propelling processes, meaning that once an initial layer of a material forms on a surface, the layer causes more of the material to be deposited. Sometimes, more heat is requested from the combustion chamber to offset the efficiency loss, and the increased heat production exacerbates the problem.

An air preheater is a heat transfer component in a power plant. The air preheater may transfer heat from re-circulating flue gases to air. The outgoing flue gases from a combustion process may pre-heat air used in other processes. The pre-heating of air reduces the amount of energy spent in raising the temperature of an otherwise cold air to a desired temperature level. Because these flue gases contain organic and inorganic chemicals, the flue gases react with metal tubes disposed within the air preheater and cause corrosion and fouling.

Due to effects as described above, performance of these components drops over time and breaks down or forces a servicing outage. Addition of chemicals to the fuel and treating the device surface is a way of reducing the effects of fouling and slagging. The addition of chemicals may be undesirable. The existing systems that monitor boilers may have a reactive warning system. This means that the systems would raise an alarm or warning only when a problem affects the boilers or other a heat transfer device. By the time the alarm is raised, the effects of fouling and slagging may have progressed to a severe stage that leaves system operators with little option other than to shutdown the boiler for cleaning and/or treating the heat transfer surfaces to bring the boiler performance to acceptable limits. Also, such reactive warning systems may be incapable of predicting when a failure of the boiler might occur. In many cases, evaluation relies instead on the operator experience and knowledge of boiler performance to predict an impending failure.

It may be desirable to have a monitoring system that differs from those systems available today. It may be desirable to have a method of monitoring a system that differs from those methods available today.

BRIEF DESCRIPTION

A system according to one embodiment of the invention includes an analysis module. The analysis module receives data from a heat transfer device, and can compute a performance indicator indicative of an incipient anomaly condition of the heat transfer device based upon the received data, and/or can compute a normalized efficiency of the heat transfer device. The normalized efficiency represents a corrected efficiency that isolates effects of one or more process parameters on performance of the heat transfer device. The data represents a measurable process parameter or a change in a measurable process parameter in the heat transfer device.

A system according to one embodiment includes a prediction module. The prediction module receives data from the heat transfer device and computes a performance indicator to predict performance degradation of the heat transfer device over time based upon the received data. The data is as above.

A method according to one embodiment includes diagnosing via a knowledge based network at least one probable cause of performance degradation of the heat transfer device based on at least one symptom indicating a change in performance of the heat transfer device; analyzing via the knowledge based network the at least one probable cause of performance degradation in the heat transfer device to estimate a time to failure of the heat transfer device; and validating via the knowledge based network the at least one probable cause based on at least a previous occurrence of the change in performance of the heat transfer device.

A method according to one embodiment includes obtaining data representing one or more measurable process parameters or a change in the one or more measurable process parameters of the heat transfer device, calculating an initial efficiency of the heat transfer device based on the at least one or more measurable process parameters, and applying a normalization model to the data to determine a normalized efficiency of the heat transfer device, wherein the normalized efficiency represents a corrected efficiency, different from the initial efficiency, that isolates the effects of the one or more process parameters of the heat transfer device.

A method according to one embodiment includes providing data representing a measurable process parameter or a change in a measurable process parameter in a heat transfer device to an analysis module to compute a performance indicator or to an efficiency correction unit to calculate an initial efficiency, detecting one or more anomaly conditions in the heat transfer device via a trend detection module based upon the a performance indicator, generating one or more prediction models based on at least the one or more anomaly conditions, wherein the at least one prediction model provides one or more probable causes of failure, detecting incipient failure of the heat transfer device via the one or more prediction models, and providing an anomaly reduction medium to the heat transfer device based on the initial efficiency or on the incipient failure detection to reduce the effects of at least one of the anomaly conditions and thereby to defeat the failure mode.

DRAWINGS

Figure 2:
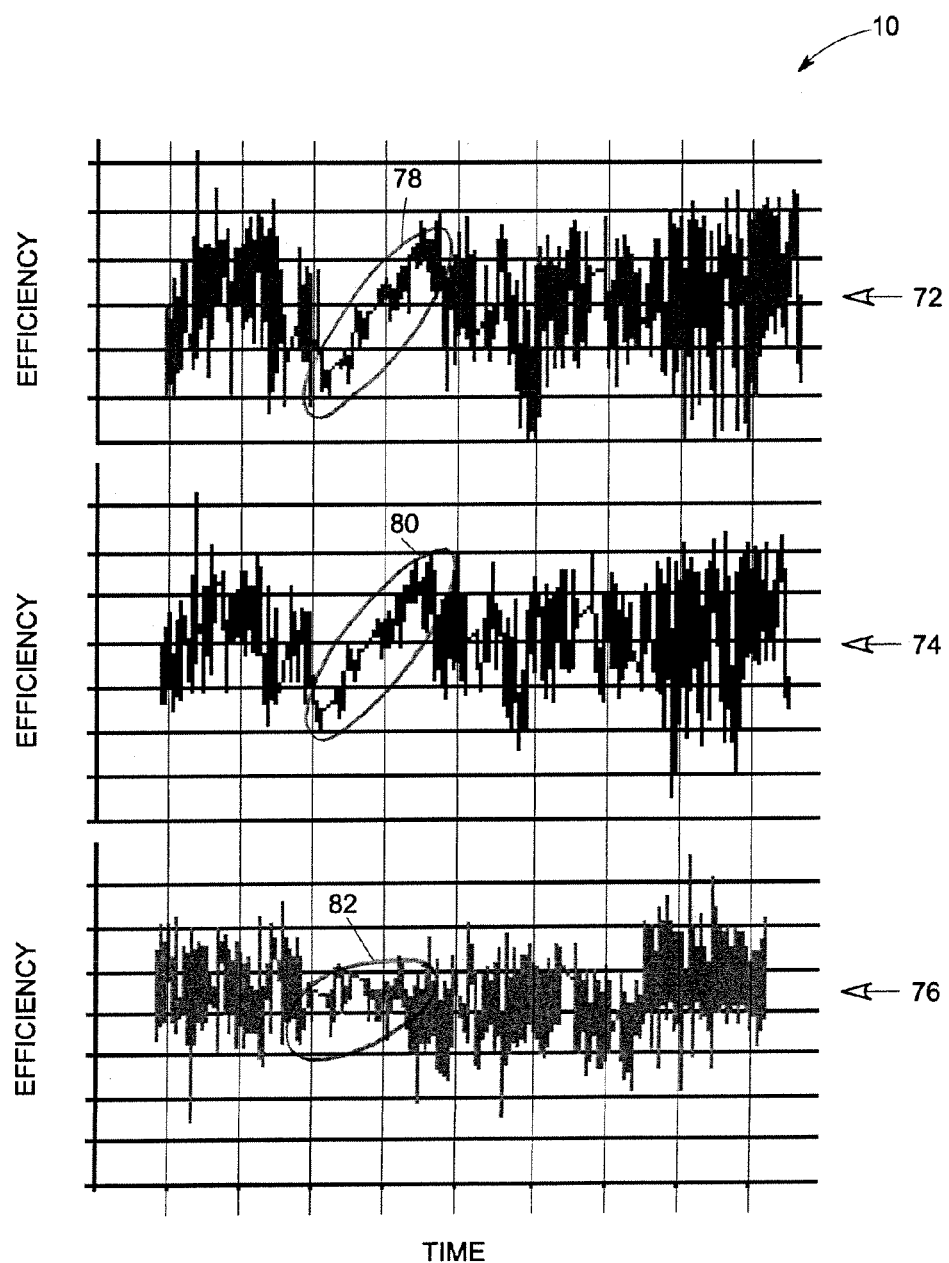
Figure 3:
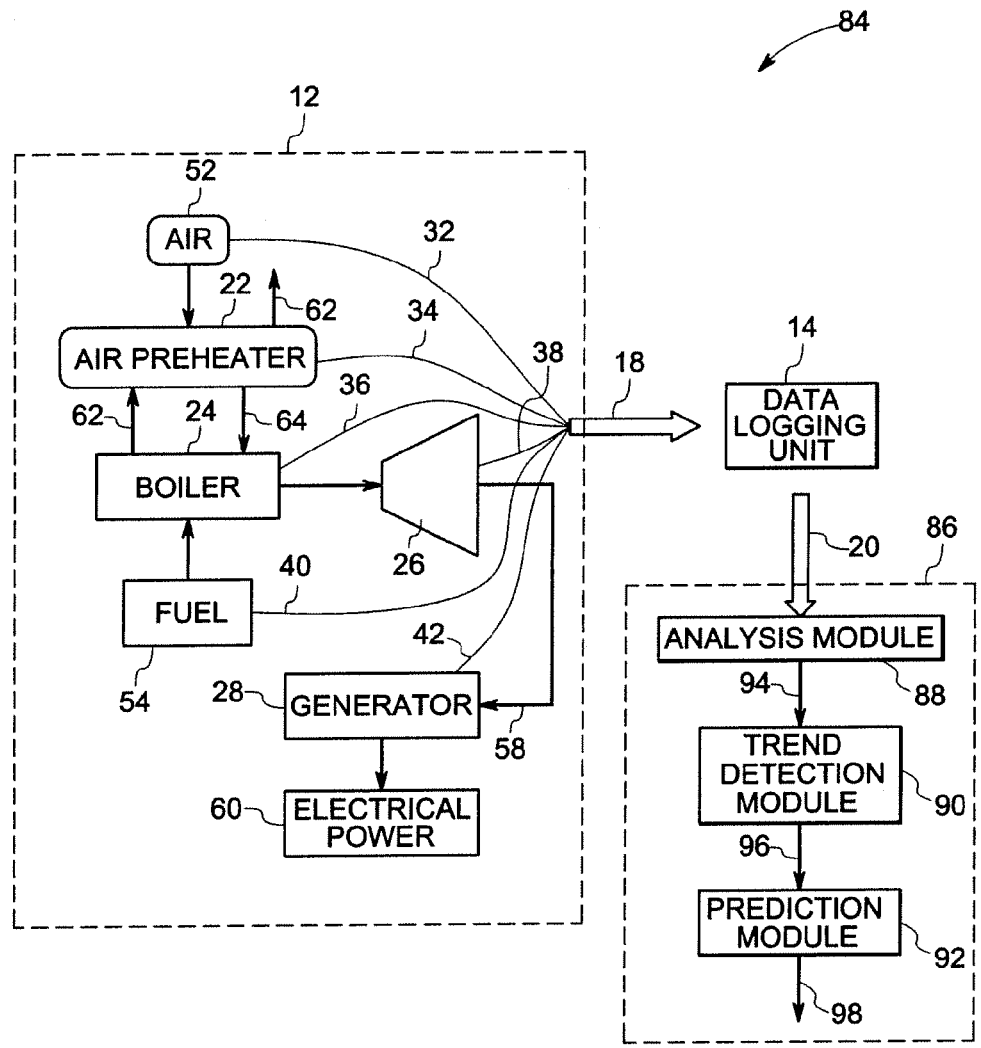
Figure 4:
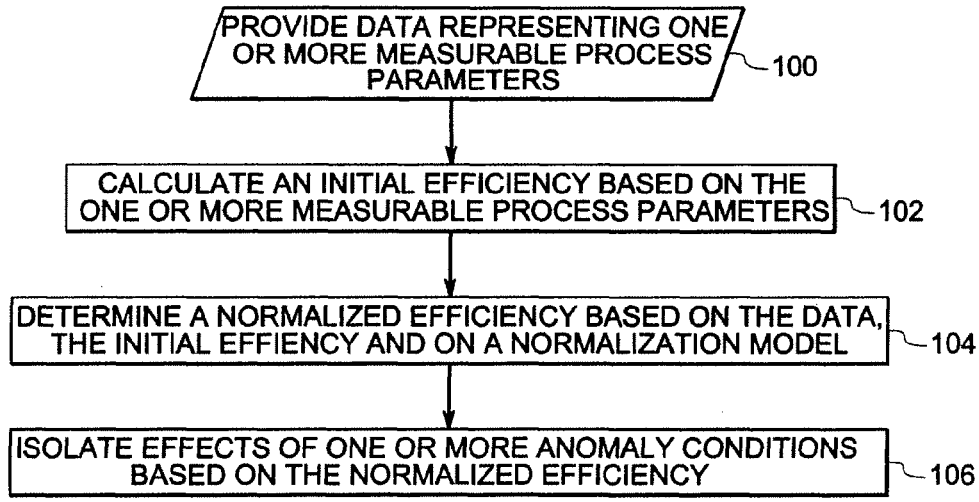
Figure 5:
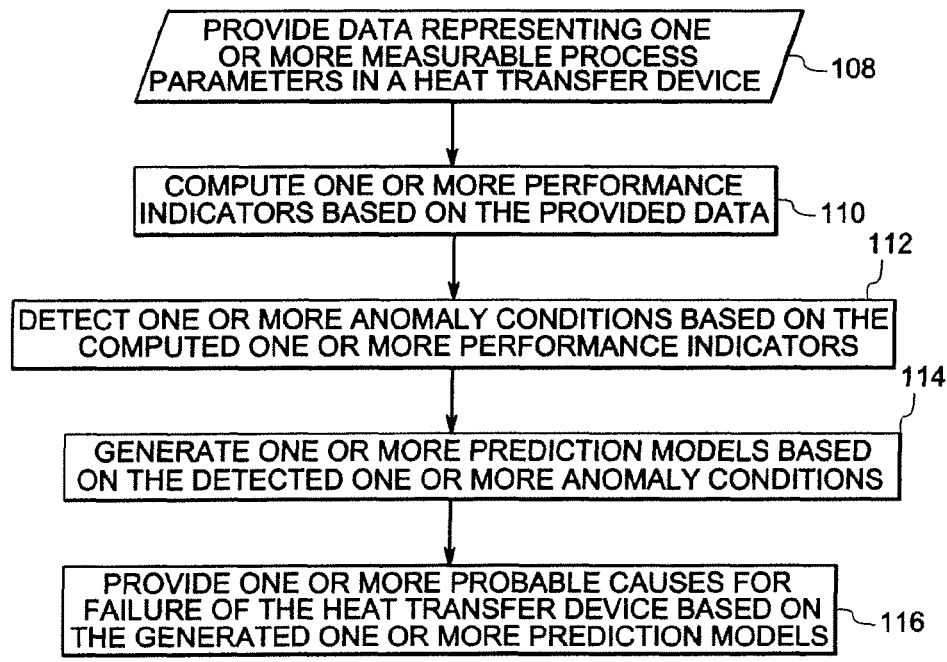
Figure 6:
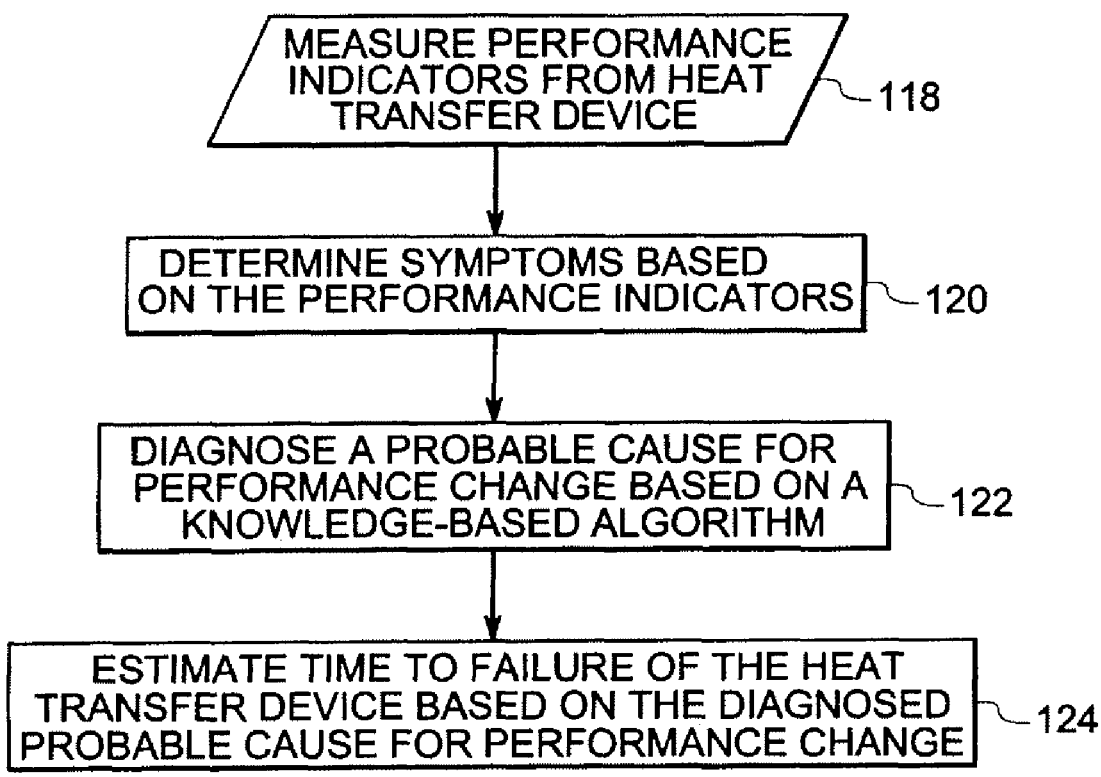

Like characters represent like parts throughout the drawings, wherein:

FIG. 1 diagrammatically illustrates an efficiency correction system for isolating effects of one or more anomaly conditions as applied to an exemplary power plant in accordance with one embodiment of the invention;

FIG. 2 diagrammatically illustrates verification of the exemplary efficiency correction system as illustrated in FIG. 1;

FIG. 3 diagrammatically illustrates a system for incipient detection of one or more anomaly conditions in a heat transfer device in an exemplary power plant in accordance with one embodiment;

FIG. 4 diagrammatically illustrates a method for isolating effects of one or more anomaly conditions as applied to the power plant of FIG. 1;

FIG. 5 diagrammatically illustrates a method for incipient failure detection of a heat transfer device in the power plant of FIG. 3; and FIG. 6 diagrammatically illustrates a method for estimating time to failure of a heat transfer device via a knowledge-based algorithm in accordance with one embodiment.

DETAILED DESCRIPTION

The invention includes embodiments that may relate to a system and/or method for monitoring one or more a heat transfer device. The heat transfer device may be in a power plant.

A system according to one embodiment of the invention includes an analysis module. The analysis module receives data from a heat transfer device, and can compute a performance indicator indicative of an incipient anomaly condition of the heat transfer device based upon the received data, and/or can compute a normalized efficiency of the heat transfer device. The normalized efficiency represents a corrected efficiency that isolates effects of one or more process parameters on performance of the heat transfer device. The data represents a measurable process parameter or a change in a measurable process parameter in the heat transfer device.

A system according to one embodiment includes a prediction module. The prediction module receives data from the heat transfer device and computes a performance indicator to predict performance degradation of the heat transfer device over time based upon the received data. The data is as above.

Referring to FIG. 1, one embodiment of an efficiency correction system 10 as applied to a power plant 12 is schematically represented, a data logging unit 14, an efficiency correction unit 16, a first communication link 18 between the power plant 12 and the data logging unit 14, and a second communication link 20 between the data logging unit 14 and the efficiency correction unit 16.

The illustrated power plant 12 includes an air preheater 22, a boiler 24, a steam turbine 26, a generator 28, and a maintenance unit 30. The data logging unit 14 is operable to monitor and measure one or more process parameters, shown by reference numerals 32 through 42 from any of the above specified components, such as the air preheater 22, the boiler 24, the steam turbine 26, the generator 28, or the maintenance unit 30.

Examples of measurable process parameters include a pressure within the boiler 24, a pressure difference between an input and output of air from the air preheater 22, a difference in temperature between the input and output of air from the air preheater 22, a pressure of steam within the boiler 24, a pressure of water within the boiler 24, a mass flow rate of fuel 54 into the boiler 24, and a mass flow rate of an anomaly reduction medium to the heat transfer device.

The efficiency correction unit 16 in this exemplary embodiment includes a base load filter 44, an efficiency calculator 46, a stability filter 48, and an efficiency normalization unit 50. In other embodiments, there may be a plurality of the various components as specified above.

The power plant 12 uses the air preheater 22 to pre-heat an input of air 52 into the boiler 24. Air 52 is used to aid in the supply of oxygen to the boiler 24 to facilitate combustion of a fuel 54 inside the boiler 24. The boiler 24 combusts the fuel 54 to heat water contained in the boiler 24 to beyond its boiling point to generate steam 56. The generated steam 56 propels a plurality of turbine blades in the steam turbine 26. The energy of steam 54 is transformed into rotary motion 58. The generator 28 is coupled to the steam turbine 26 to produce electrical power 60 as an output.

The boiler 24 operates more efficiently with air 52 at an elevated temperature. To achieve that elevated temperature, the air 52 is preheated before it enters the boiler 24. Once combustion in the boiler 24 begins, the flue gas 62 released during the combustion can be re-circulated to the air preheater 22 where the flue gas 62 can be used to pre-heat the incoming air 52 into the boiler 24. The pre-heated air 64 enters the boiler 24, while the flue gas 62 leaves the air preheater 22. The flue gas 62 can be circulated within tubes, while in other exemplary embodiments the flue gas 62 can be passed around tubes through which air is forced.

The air preheater 22 and the boiler 24 can be grouped as one aspect of a heat transfer device. In the discussions that follow, it should be noted that the term 'heat transfer device' refers to one or more of the air preheater 22, the boiler 24, a furnace, a furnace waterwall, an economizer, a superheater, or a reheater.

Performance of the power plant 12 is measured primarily on how much electrical power 60 the power plant 12 produces for a given quantity of fuel 54. There may be a variety of factors that influence the performance of the power plant 12. These include quality of the fuel 54 and the capabilities of the heat transfer device. Quality of the fuel 42 further depends on the type of fuel 54 used, the heating value of the fuel 54, the moisture content in the fuel 54, the ash content in the fuel 54, and the residual deposits from the fuel 54 following combustion. Capability of the boiler 24 is may dependent on a heating capacity of the boiler 24, pressure confining capacity of the boiler 24, temperature rating of the boiler 24, and water storage capacity of the boiler 24. Capability of the air preheater 22 also depends on chemical composition of the flue gas 62 released during combustion, pressure generated inside tubes in the air preheater 22, and temperature rating of the air preheater 22.

In practice, however, the efficiency of the power plant 12 may depend on many more factors other than those previously described. For example, flue gas 62 released during combustion in a boiler 24, additives added to the water, additives added to the surface of the boiler 24, metallic tubes and structures in the air preheater 22 or the boiler 24 may chemically react with the various structures in the boiler 24 to create one or more anomaly conditions that interfere in the functioning of the boiler 24. The air preheater 22 may also suffer from a similar effect of reaction of flue gas 62 with metallic tubes and structures inside the air preheater 22, and also between the flue gas 62 and any heat-exchanging medium within the air preheater 22. While each of the above described interactions produces useful work, they also hinder the functioning of the heat transfer device.

Anomaly conditions within the heat transfer device include the effects of fouling, slagging, and corrosion by-products.

In one embodiment of the invention, the efficiency correction unit 16 proactively isolates the effects of one or more process parameters on the performance of the heat transfer device. In other implementations, the efficiency correction unit 16 may isolate the effects of one or more anomaly conditions during the onset of the anomaly conditions.

The efficiency correction unit 16 computes a normalized efficiency by determining a normalized efficiency 68, and this normalized efficiency 68 provides a more accurate addition of anomaly reduction medium 66 to the heat transfer device 22, 24 and to the various other units in the power plant 12. The anomaly reduction medium 66 may include deposit conditioning additives, combustion catalysts, reflectivity modifiers, or their various combinations and derivatives. Examples of deposit conditioning additives include magnesium-based slurries like FUELSOLV FMG2960, FUELSOLV FMG8420. Examples of combustion catalysts like FUELSOLV CEC2567 and FUELSOLV CEC3110. Examples of reflectivity modifiers include sodium-based powders like FUELSOLV FS3954. The addition of the anomaly reduction medium 66 via the present technique may reduce or eliminate one or more anomaly conditions. In one aspect, the present technique may detect early an anomaly, leading to sparse usage of the medium 66, thus adding to efficiency of the unit and preventing any side effects of the medium 66.

When the heat transfer devices 22, 24 function, a plurality of process parameters depicted by reference numerals 32-42 may be measured as data. Such data may be sampled and collected by the data-logging unit 14 via the first communication link 18. In certain other exemplary embodiments of the present technique, the data-logging unit 14 may also include a plant information (PI) system. The data-logging unit 14 may sample the data from the various units via sensors placed in and around the heat transfer device 22, 24 at appropriate locations. Examples of sensors include a pressure sensor, a temperature sensor, and a mass flow rate sensor. A period for sampling data from the heat transfer device 22, 24 may vary from about 5 minutes to about 10 hours. The first communication link 18 linking the power plant 12 to the data-logging unit 14 may include a wired link when the data-logging unit 14 is located in the vicinity of the power plant 12 or a wireless, radio-frequency link when the data-logging unit 14 is located beyond the vicinity of the power plant 12. The efficiency correction unit 16 is linked to the data-logging unit 14 via a second communication link 20. Similar to the first communication link 18, the second communication link 20 may be a wired link or a wireless link as needed.

The base load filter 44 removes the effects of transient conditions caused due to a varying load on the power plant 12. Base load may be defined as the condition when the power plant operates under design conditions and produces the rated power. Demand for electricity may varies from hour to hour in most commercial and industrial areas. The demand for electrical power may change continuously. Still, the power plant 12 may supply a certain amount of electrical power 60. A varying load condition is partially, but certainly, responsible for causing variation in the efficiency of the power plant 12 and the base load filter 44 may reduce the effects of such variations in determining the efficiency of the power plant 12.

The efficiency calculator 46 calculates an initial efficiency of the heat transfer device 22, 24. In one exemplary case, the initial efficiency is calculated using an output-loss method, but any other known method for efficiency calculation is equally applicable. The output loss method is an extension of the heat loss method as prescribed by the American Society of Mechanical Engineers (ASME) Performance Test Code 4.0. The principle of the output loss method is that an input to the heat transfer device comprises output from the heat transfer device and losses in the heat transfer device. For example, input variables to the boiler 24 may include a mass flow rate M of fuel 54 and a calorific value H of the fuel 54. The output from the boiler 24 is the amount of heat Q transferred to the water contained in the boiler 24 to produce steam. Therefore, the efficiency $\eta$ of the boiler 24 may be symbolically and ideally be represented as:

$$\text{Efficiency of the boiler unit: } \eta = \frac{\text{Output}}{(\text{Output} + \text{Losses})} \quad \text{(Eq. 1)}$$

Apart from the above-specified variables, the efficiency of the boiler 24 may also depend on moisture content of air 38, moisture content in the fuel 54, and heat loss due to onset of fouling and slagging conditions and these factors need to be considered while computing an efficiency of the boiler 24.

The stability filter 48 comprises one or more stability filters operable from the standards specified by the ASME. The stability filter 48 is responsible for enforcing stability regulations for temperature and pressure variations as specified in the ASME Performance Test Code 4.0. For example, the standards state that for stable operation of a boiler, maximum variation of temperature and pressure should be within a certain tolerable range. The standards also allow the range to vary with application of the boiler. In accordance with certain aspects of the present technique, the stability filter 48 limits data to specify a temperature variation of less than 20 degrees Fahrenheit (F) and a pressure variation of less than 20 pounds per square inch (PSI). The purpose of incorporating the stability filter 48 is to limit the sampled data to data that represents stable operation and to avoid any miscalculation of efficiency due to improper data that may be termed as outliers or rare occurrences. The function of the stability filter 48 may be represented symbolically as:

$$\text{Max } [P_{MS}(t):P_{MS}(t+1 \text{ hour})] - \text{Min } [P_{MS}(t):P_{MS}(t+1 \text{ hour})] < 20 \text{ PSI} \quad \text{(Eq. 2)}$$

$$\text{Max } [T_{MS}(t):T_{MS}(t+1 \text{ hour})] - \text{Min } [T_{MS}(t):T_{MS}(t+1 \text{ hour})] < 20 \text{ F} \quad \text{(Eq. 3)}$$

where, $P_{MS}$ represents main steam pressure in the boiler 24 and $T_{MS}$ represents a main steam temperature in the boiler 24. Equation 2 specifies that for pressure variation in the boiler steam pressure to be classified as stable, the pressure variation should not be more than 20 PSI in a time period of 1 hour.

Equation 3 specifies that for the temperature variation in the boiler to be classified as stable, the temperature variation should not be more than 20 degrees F. in a time period of 1 hour. The time period of 1 hour may be changed accordingly to suit various desired stability levels. While the indicated values of 20 PSI and 20 degrees F. may be exemplary values for use validating the present technique, the values of pressure and temperature stability levels may be altered as desired for any particular device operation.

Once the data sampled from the power plant 12 has been classified as representing stable operation, a normalized efficiency ($\eta^*$) for the power plant 12 based on the initial efficiency ($\eta$) is computed. A form of the normalization model is used to compute the normalized efficiency, wherein the normalization model depends on the measured and design values for at least one of the following factors: the main steam pressure, the higher heating value of the fuel, the mass flow rate of the fuel, the cold reheat pressure of the steam, the cold reheat pressure of the air, and the gross power output from the steam turbine. The normalization efficiency may symbolically be represented as:

$$\eta^* = \eta - c0 + c1\left(\frac{HHV}{HHV^*}\right) + c2\left(\frac{Mf}{Mf^*}\right) + c3\left(\frac{Pms}{Pms^*}\right) + \quad \text{(Eq. 4)}$$
$$c4\left(\frac{Pcro}{Pcro^*}\right) + c5\left(\frac{Pcra}{Pcra^*}\right) + c6\left(\frac{Pg}{Pg^*}\right)$$

where $\eta$ is the initial efficiency of the boiler unit, HHV and HHV* may be the measured and the specified higher heating value of the fuel, Mf and Mf* may be the measured and the specified mass flow rate of the fuel, Pms and Pms* may be the measured and the specified main steam pressure inside the boiler unit, Pcro and Pcro* may be the measured and the specified cold reheat pressure, Pcra and Pcra* may be the measured and the specified attemperator pressure in the boiler unit, and Pg and Pg* may be the measured and specified gross power generated by the generator coupled to the turbine unit. Attemperation is the process by which final temperature of steam from the boiler is controlled by spraying water or steam at a lower temperature on the steam generated inside the boiler. All the specified values for the various terms in the above equation may be the design specifications of the various components that comprise the power plant 12.

The computation of the normalized efficiency results in reduction in the variation of efficiency. FIG. 2 illustrates evidence 70 of the validation of the present technique. FIG. 2 includes three plots 72, 74 and 76 which represent variation of efficiency (represented by the vertical axis) with time (represented by the horizontal axis). Plot 72 represents change in the initial efficiency in a heat transfer device with time. Region 78 represents a first variation of efficiency. Plot 74 represents the efficiency of the heat transfer device after the sampled data has been passed through the stability filter 48 illustrated in FIG. 1. It may also be noted that the efficiency of the heat transfer device shows less variation, indicated by region 80. Finally, plot 76 represents the variation of normalized efficiency with time and region 82 provides evidence of decreased deviation in efficiency of the heat transfer device once the efficiency and data from the heat transfer device has been normalized.

The reduced variation also allows for a better understanding of effects of anomaly conditions such as fouling and slagging on the performance of the heat transfer device. Based on the better understanding of the effects of the anomaly conditions, a system operator can provide the anomaly reduction medium 66 via the maintenance unit 30 to the boiler 24, the fuel 54, the water in the boiler 24, the furnace in the boiler 24, and the tubes of the air preheater 22 well in advance and prevent the onset of the anomaly conditions. Such an early and proactive step of reducing the occurrence of the anomaly conditions also results in a reduced usage of the anomaly reduction medium 66, lessening the maintenance cost of the power plant 12. The above embodiment has been explained with the boiler 24 as an example. The present technique may be applied in air preheaters and super heater units.

FIG. 3 diagrammatically illustrates an exemplary system 84 for incipient detection of at least one anomaly condition in a power plant 12, as illustrated and described previously. Apart from the power plant 12, the data logging unit 14, and the first and the second communication links 18, 20 respectively, the exemplary system 84 also includes an incipient detection module 86 that includes an analysis module 88, a trend detection module 90, and a prediction module 92.

The analysis module 88 is operable to receive data representing one or more measurable process parameters represented by reference numerals 32-42 (FIG. 1) from the power plant 12 and to compute a performance indicator 94 based on the received data. For example, in the case of an air preheater 22, the inputs to the air preheater 22 would be in the form of air 52 and hot flue gas 62 from the combustion process in the boiler 24. The inputs have a pressure and a temperature associated with them. Similarly, the output from the air preheater 22 is air 64 at an elevated temperature, and relatively cooler flue gases at a certain output temperature and pressure associated with each of the outputs. While sampling data from the air preheater 22, the above-specified variables may be taken as the pertinent data and used to compute one or more performance indicators 94. In the case of the air preheater 22, typical performance indicators include an efficiency factor, an effectiveness factor, a difference in flue gas pressure, a difference in air pressure, and a temperature difference either on a normal scale or on a logarithmic scale.

$T_{gi}$, $T_{go}$, $T_{ai}$, $T_{ao}$ in the below equations represent the input and outlet temperatures of flue gas and air respectively, and $P_{gi}$, $P_{go}$, $P_{ai}$, $P_{ao}$ represent the input and output pressures of flue gas and air respectively. The analysis module 88 computes each of the performance indicators 94 specified above based on the equations indicated below:

$$\text{Efficiency factor} = \frac{T_{gi} - T_{go}}{T_{gi} - T_{ai}} \quad \text{(Eq. 7)}$$

$$\text{Effectiveness factor} = \frac{T_{ao} - T_{ai}}{T_{gi} - T_{ai}} \quad \text{(Eq. 8)}$$

$$\text{Difference in gas pressure, Gas } \Delta P = P_{gi} - P_{go} \quad \text{(Eq. 9)}$$

$$\text{Difference in air pressure, Air } \Delta P = P_{ai} - P_{ao} \quad \text{(Eq. 10)}$$

$$\text{Log Mean Temperature Difference} = \frac{(\{T_{gi} - T_{ao}\} - \{T_{go} - T_{ai}\})}{\ln(\{T_{gi} - T_{ao}\}/\{T_{go} - T_{ai}\})} \quad \text{(Eq. 11)}$$

where ln represents a natural logarithm.

It should be noted that for the air preheater 22, the input flue gas temperature $T_{gi}$ would be higher than the output flue gas temperature $T_{go}$. However, because the air absorbs a part of heat from the flue gas, the input temperature of air $T_{ai}$ would be relatively lower than the output temperature of air $T_{ao}$ from the air preheater 22.

The trend detection module 90 takes one or more of the computed performance indicators 94 and verifies whether the performance indicators 94 represent a stable operation. The tolerance limit for determining stable operation may be provided by a system operator to the system or it could be an inherent part of the trend detection module 90 itself. Trend detection may be performed through trend estimation, hypothesis testing, or exponential filtering or by their any combination.

Trend estimation is a technique where a series of measurement of process parameters from a heat transfer device represent a time series and statistical techniques may be applied to the time series to make and justify statements made on detected trends in the time series. This technique may make a valid prediction or generation of a trend model based on the time series of measurements.

Hypothesis testing is another procedure that enables a system operator to determine whether a particular detected anomaly condition is due to a specific measured process parameter or not. The primary focus of this procedure is to rule out chance as a cause for occurrence of the particular anomaly condition. Hypothesis testing starts, in principle, with a null hypothesis and an alternate hypothesis. The null hypothesis specifies that a user does not see a difference in the particular anomaly condition caused by one or more process parameters. The alternate hypothesis states otherwise.

The trend detection module 90 provides information 96 on any anomaly condition present based on the trend detection and validation performed. Equations representing various physics based models to compute a trend may be symbolically represented as follows:

$$\mu_r(t) = \{\Sigma \Delta P(t)\}/\tau \qquad \text{(Eq. 12)}$$

$$\text{Null Hypothesis: } \mu_r(t) = \mu_r(t-1) \qquad \text{(Eq. 13)}$$

$$\text{Alternate Hypothesis: } \mu_r(t) \neq \mu_r(t-1) \qquad \text{(Eq. 14)}$$

wherein $\mu_r(t)$ represents a log normal distribution, and t, a time period.

The information 96 is fed to a prediction module 92. The prediction module 92 analyzes the one or more anomaly conditions and generates a prediction model 98 that provides information such as time to outage. Based on the prediction model 98, a system operator may decide what would be an appropriate time to provide and schedule maintenance to prevent an occurrence of any failure based on the detected anomaly condition. Such proactive maintenance results in reduction of usage of the anomaly reduction medium. Also, such maintenance results in longer system life and improved efficiency of the system in its entirety. Exemplary prediction modules 98 include calculation of a change in pressure at a later point in time, based on the present change in pressure. With such an exemplary prediction model, it is possible to compute an exemplary time to outage for the air preheater 22. The exemplary prediction model 98 and computation of time to outage may symbolically be represented as:

$$\Delta P(t+n) = \mu_r(t)*(t+n) + c \qquad \text{(Eq. 15)}$$

$$\text{Time to Outage } (t) = \frac{\beta - \Delta P(t)}{\mu_r(t)} \qquad \text{(Eq. 16)}$$

where $\beta$ is a constant, which when reached determines that the heat transfer device, the air preheater 22 in this example, has failed. More particularly, equation 16 specifies how long the heat transfer device would take to reach from $\Delta P(t)$ to $\beta$ given a rate of increase in pressure of $\mu_r(t)$.

Next will be described a method for isolating the effects of one or more anomaly conditions in an exemplary power plant and a method for incipient detection of one or more anomaly conditions.

FIG. 4 illustrates an exemplary method for isolating the effects of one or more anomaly conditions in the power plant 12 via the system 10 (FIG. 1). The method involves the steps of providing data, at step 100, representing one or more measurable process parameters from the power plant 12 to an efficiency correction unit 16 via a data logging unit 14. The data may be provided continuously from the heat transfer device and other units in the exemplary power plant to the efficiency correction unit 16 or it can be provided to the efficiency correction unit 16 as previously recorded data. Once the data is provided to the efficiency correction unit 16, the following events occur: calculating an initial efficiency $\eta$, at step 102, based on the provided data; determining a normalized efficiency $\Theta^*$, at step 104, based on the initial efficiency $\eta$ and on a normalization model via the normalization unit; and, isolating the effects of one or more anomaly conditions, at step 106, based on the determined normalized efficiency $\eta^*$.

FIG. 5 illustrates an exemplary method for incipient failure detection the heat transfer device based on the system described and illustrated in FIG. 2. Data representing one or more measurable process parameters in the heat transfer device is provided at step 108 to the analysis module 88 (FIG. 3). In one embodiment of the present technique, the data from the heat transfer device may be provided continuously in real-time or near real-time. The data logging unit 14 may collect the data. In one embodiment, a plant information system could track and measure the one or more measurable process parameters. This results in an instantaneous evaluation of the heat transfer device. In other embodiments of the present technique, the data may be collected and recorded. Using suitable means, the recorded data may be provided at a later period in time for further evaluation and analysis of the heat transfer device. Once the data is received, the system 10 performs the remaining sequence of steps of computing one or more performance indicators, at step 110, based on the provided data; detecting, at step 112, one or more anomaly conditions based on the computed one or more performance indicators; generating, at step 114, one or more prediction models based on the detected one or more anomaly conditions; and finally, providing, at step 116, one or more probable conditions for failure of the heat transfer device at a later point in time.

In another exemplary embodiment of the present technique, it is also possible to diagnose performance degradation of the heat transfer device via a knowledge-based network. Examples of a heat transfer device have been illustrated and described previously. An example of a suitable knowledge-based network is a cause and effect network. The cause and effect network includes the Bayesian network, also commonly known as the Bayesian Belief Network (BBN). The BBN is a belief network that is built upon existing knowledge based on occurrences of certain conditions in the past, experimental results and factual field information gathered from the heat transfer device itself. For a proper diagnosis and estimate of a time to failure, a Bayesian network provides a many-to-many relationship between the failure modes, states of operation of the heat transfer device, and observed symptoms in the heat transfer device. A Bayesian network is a sub-class of a cause-effect network that has been used predominantly for diagnosis in a variety of fields and should be considered as an exemplary case. Any other network representative of the cause and effect network may be used in place of the BBN.

Advantages of using a Bayesian network include a graphical representation of the rules, probabilistic reasoning, an ability to reason in the absence of sensors operable to measure a plurality of measurable process conditions, and not being required to explicitly state all combinations of rules. The advantages of a Bayesian network provide an excellent reason for application of the technique to estimate a probable time to failure of the heat transfer device. In the exemplary embodiment of the present technique, a Bayesian network has been developed. The Bayesian network includes a failure mode effects analysis (FMEA) providing initial information to the Bayesian network. An exemplary heat transfer device monitored by the Bayesian network would have a plurality of alarms and manual observations which provide information on whether a failure in the heat transfer device is occurring or not. In order to perform a diagnosis of the heat transfer device to truly determine an occurrence of the failure, the Bayesian network applies Bayes' theory to calculate a plurality of probable root causes. In certain implementations of the present technique, an estimate of the time to failure of the heat transfer device is provided based on the Bayes theory which incorporates past occurrences with symptoms that indicated the occurrence and that of an actual recorded failure of the heat transfer device. Apart from being able to estimate time to failure, the Bayesian network can also be used in detecting and isolating failure modes.

FIG. 6 illustrates an exemplary method for estimating time to failure of a heat transfer device via a knowledge-based algorithm. The method involves the steps of measuring, at step 118, process parameters from the heat transfer; computing, at step 120, performance indicators 94 based on the measured process parameters; determining symptoms, at step 122, based on the computed performance indicators 94; diagnosing, at step 124, one or more probable cause for the one or more symptoms via the knowledge-based algorithm; and estimating, at step 126, a time to failure of the heat transfer device based on the one or more probable cause for the one or more symptoms.

In accordance with certain embodiments of present technique, code or blocks of code may be used to perform at least one for an incipient detection of one or more anomaly conditions in the heat transfer device, for predicting a performance degradation over time of the heat transfer device, for an estimation of a time to failure of the heat transfer device, or for isolating the effects of one or more process parameters that affect the performance of the heat transfer device. The various embodiments and aspects already described may comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or flash memory) (magnetic), an optical fiber (optical), and a portable compact disc read-only memory (CDROM) (optical). Note that the computer readable medium may comprise paper or another suitable medium upon which the instructions may be printed by mechanical and electronic means or be hand-written. For instance, the instructions can be electronically captured via optical scanning of the paper or other medium, then compiled, interpreted or otherwise processed in a suitable manner if necessary, and then stored in a computer readable memory.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable.

The embodiments described herein are examples of articles, systems, and methods having elements corresponding to the elements of the invention recited in the clauses. This written description may enable those of ordinary skill in the art to make and use embodiments having alternative elements that likewise correspond to the elements of the invention recited in the clauses. The scope of the invention thus includes articles, systems and methods that do not differ from the literal language of the clauses, and further includes other articles, systems and methods with insubstantial differences from the literal language of the clauses. While only certain features and embodiments have been illustrated and described herein, many modifications and changes may occur to one of ordinary skill in the relevant art. The appended clauses cover all such modifications and changes.

The invention claimed is:

1. A method, comprising:
    diagnosing, via a knowledge based network implemented on one or more computer-based systems, at least one probable cause of performance degradation of a heat transfer device based on at least one symptom indicating a change in performance of the heat transfer device;
    analyzing, via the knowledge based network, the at least one probable cause of performance degradation in the heat transfer device to estimate a time to failure of the heat transfer device; and
    validating, via the knowledge based network, the at least one probable cause based on at least a previous occurrence of the change in performance of the heat transfer device.

2. The method as defined in claim 1, comprising determining a detectability and an isolation capability for the probable cause of occurrence of the performance change based upon a cause and effect network.

3. The method as defined in claim 1, further comprising monitoring the at least one symptom at a plurality of locations on the heat transfer device.

4. A method, comprising:
    providing data representing a measurable process parameter or a change in a measurable process parameter in a heat transfer device to an analysis module to compute a performance indicator or to an efficiency correction unit to calculate an initial efficiency;

detecting an anomaly condition in the heat transfer device via a trend detection module based upon the a performance indicator;

generating one or more prediction models based on an anomaly condition, and the prediction model provides one or more probable causes of failure;

detecting incipient failure of the heat transfer device via the one or more prediction models; and providing an anomaly reduction medium to the heat transfer device based on the initial efficiency or on the incipient failure detection to reduce the effects of at least one of the anomaly conditions and thereby to defeat the failure mode.

\* \* \* \* \*